UNITED STATES PATENT OFFICE.

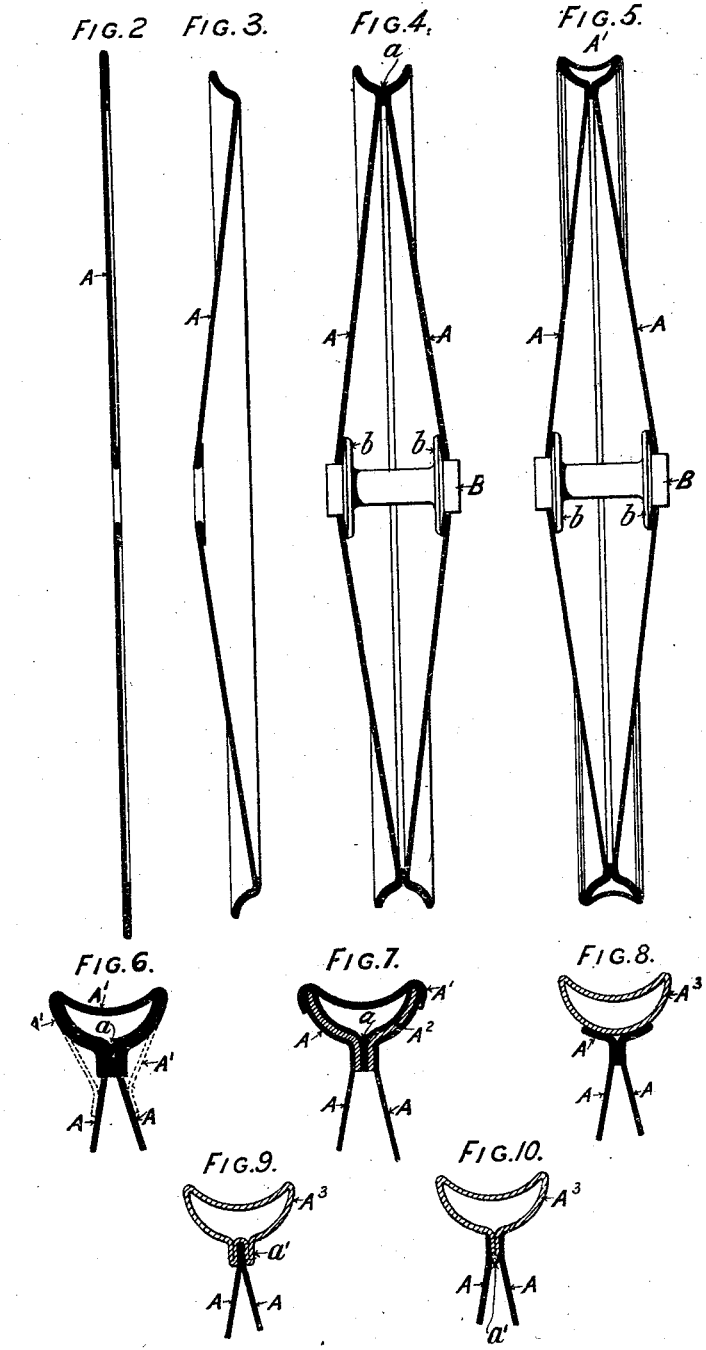

ARTHUR COMINGS HIDE, OF LONDON, ENGLAND, ASSIGNOR TO THE DISC WHEEL COMPANY, LIMITED, OF SAME PLACE.

WHEEL FOR VELOCIPEDES.

SPECIFICATION forming part of Letters Patent No. 478,191, dated July 5, 1892.

Application filed December 7, 1891. Serial No. 414,244. (No model.) Patented in England May 15, 1891, No. 8,395.

*To all whom it may concern:*

Be it known that I, ARTHUR COMINGS HIDE, a subject of the Queen of Great Britain, residing at Battersea, London, in the county of Surrey, England, have invented a new and useful Improvement in Wheels for Velocipedes, (for which I have obtained a patent in Great Britain, No. 8,395, bearing date May 15, 1891,) of which the following is a specification.

My invention relates to an improved construction of wheel for velocipedes; and it consists in building up the wheel with two disks of sheet metal instead of spokes, and in combining therewith a hollow rim for the elastic tire, the object being to obtain a strong, light, and rigid wheel.

I am aware that it is not broadly new to use two disks of metal for connecting the hub of a wheel to the rim thereof instead of spokes; but all such wheels hitherto constructed have been failures from one or two causes, either on account of their increased weight or on account of their want of strength and rigidity. Hitherto in all attempts to construct disk-wheels the rim of the wheel has been formed of simple extensions of the disks forming the sides of the wheel, with the result that to obtain a rim sufficiently strong and rigid to carry the tire the substance of the plates forming the disks had to be considerably thicker than was necessary as mere substitutes for spokes. Consequently all such wheels have proved failures on account of their excessive weight.

I attain the object of my invention in the manner shown by the accompanying drawings, in which—

Figures 1, 2, 3, 4, and 5 show the progressive stages of the construction of my improved disk-wheel, and Figs. 6, 7, 8, 9, and 10 show modifications in the construction thereof. Throughout these figures similar parts are marked with like letters of reference.

In constructing my improved wheel I take two circular disks A of sheet metal, as shown by Fig. 1 of the accompanying drawings. In the center of each disk a hole is formed by pressing the metal up and turning it back, as shown by Fig. 2 of the accompanying drawings, thus giving increased thickness where it is riveted or otherwise fixed to the flange of the hub. The edge or periphery of each disk is also turned back, as shown by Fig. 2 of the accompanying drawings, to give a double thickness of metal to that part adapted to form part of the hollow rim of the wheel. Each disk is then stamped, pressed, or blocked into the desired shape to form one side of the wheel, as shown by Fig. 3 of the accompanying drawings. Two of these disks are then riveted or brazed to the flanges $b$ of the hub B of the wheel, and are riveted or otherwise fixed together at that part forming the rim, as shown by Fig. 4 of the accompanying drawings. To complete the rim, a hoop or strip of metal $A'$, rolled into a crescent shape and having turned-over edges, is placed over that part of the rim formed by the disks and is brazed, sweated, or clinched thereto, as shown by Fig. 5 of the accompanying drawings. The method I prefer to adopt for fixing the two disks A together at the rim is to place them in a screw-press and to braze or sweat them together at that part marked $a$ before the outer hoop or strip $A'$ is put on.

When the substance of the metal used for the disks A is so thin that a double thickness of it is not sufficient to give the required strength at the rim, I increase that strength at that part either by using a wider strip of metal for the part $A'$ and lapping its edges down round or across the exterior part of the rim, as shown by Fig. 6 of the accompanying drawings, or by inserting in the peripheral folds of the disks A a strengthening-strip $A^2$, as shown by Fig. 7 of the accompanying drawings. As a modification of these devices I take a hollow rim $A^3$ of any approved construction and I seat it in the rim formed by the disks A, as shown by Fig. 8 of the accompanying drawings, and braze or sweat it thereto, or as a further modification I form on the said hollow rim one or more radial flanges $a'$, adapted to receive the disks A, as shown by Figs. 8 and 9 of the accompanying drawings, and to be riveted, brazed, or sweated thereto. In Fig. 10 the flanges $a'$ are placed between the disks A A. By this construction it will be apparent that the rim may be made as strong as necessary, and the disks—the equivalent of the spokes—as light as possible, irrespective of each other.

What I claim is—

1. In a wheel, the combination, with a hub, of two dished plates inclosing the hub, the metal of each plate being of greater thickness around the hub and at the periphery than at the intermediate parts of the plate, and the two said plates having their thickened edges secured together and adapted to support an elastic tire, substantially as set forth.

2. In a wheel, the combination, with a hub, of two dished plates inclosing the hub, the metal of each plate being of greater thickness around the hub and at the periphery than at the intermediate parts of the plate, and the said two plates being secured together and flared outwardly at their edges, and a ring secured to the thickened edges of the two said plates and adapted to support an elastic tire, substantially as set forth.

ARTHUR COMINGS HIDE.

Witnesses:
ROBT. ED. PHILLIPS,
W. H. JAMES.